US010851199B2

United States Patent
Toba et al.

(10) Patent No.: US 10,851,199 B2
(45) Date of Patent: Dec. 1, 2020

(54) EPOXY (METH) ACRYLATE COMPOUND AND CURABLE COMPOSITION CONTAINING SAME

(71) Applicant: SHOWA DENKO K. K., Tokyo (JP)

(72) Inventors: Masahiko Toba, Tokyo (JP); Jun Dou, Tokyo (JP); Chika Yamashita, Tokyo (JP); Yoshitaka Ishibashi, Tokyo (JP); Hiroshi Uchida, Tokyo (JP)

(73) Assignee: SHOWA DENKO K. K., Tokyo (JP)

( * ) Notice: Subject to any disclaimer, the term of this patent is extended or adjusted under 35 U.S.C. 154(b) by 118 days.

(21) Appl. No.: 16/320,606

(22) PCT Filed: Jul. 24, 2017

(86) PCT No.: PCT/JP2017/026644
§ 371 (c)(1),
(2) Date: Jan. 25, 2019

(87) PCT Pub. No.: WO2018/021224
PCT Pub. Date: Feb. 1, 2018

(65) Prior Publication Data
US 2019/0153149 A1    May 23, 2019

(30) Foreign Application Priority Data

Jul. 28, 2016  (JP) ................ 2016-148390

(51) Int. Cl.
| C08G 59/14 | (2006.01) |
| C08G 59/17 | (2006.01) |
| C08F 299/02 | (2006.01) |
| C08F 20/32 | (2006.01) |
| C08G 59/02 | (2006.01) |
| C08G 59/24 | (2006.01) |
| C08L 63/10 | (2006.01) |

(52) U.S. Cl.
CPC .......... *C08G 59/1466* (2013.01); *C08F 20/32* (2013.01); *C08F 299/02* (2013.01); *C08G 59/022* (2013.01); *C08G 59/027* (2013.01); *C08G 59/245* (2013.01); *C08L 63/10* (2013.01)

(58) Field of Classification Search
CPC .. C08G 59/022; C08G 59/027; C08G 59/245; C08G 59/1466; C08F 20/32; C08F 299/02; C08L 63/10
See application file for complete search history.

(56) References Cited

U.S. PATENT DOCUMENTS

| 2,965,607 A | 12/1960 | Martin et al. |
| 4,439,291 A | 3/1984 | Irving et al. |
| 4,724,031 A | 2/1988 | Monnier et al. |
| 5,578,740 A | 11/1996 | Au et al. |

(Continued)

FOREIGN PATENT DOCUMENTS

| GB | 841589 A | 7/1960 |
| JP | 56-93718 A | 7/1981 |
| JP | 61-289084 A | 12/1986 |

(Continued)

OTHER PUBLICATIONS

Jianglei Qin et al., "Use of eugenol and rosin as feedstocks for biobased epoxy resins and study of curing and performance properties", Research Article, Polym Int, Society of Chemical Industry, 2014, pp. 760-765, vol. 63.

(Continued)

*Primary Examiner* — Sanza L. McClendon
(74) *Attorney, Agent, or Firm* — Sughrue Mion, PLLC (57) ABSTRACT

An epoxy (meth)acrylate compound represented by general formula (1):

$$\text{(1)}$$

where at least one of $R^1$ to $R^5$ has a structure represented by formula (2):

$$\text{(2)}$$

* denotes the bonding position to a carbon atom that constitutes the benzene ring to which $R^1$ to $R^5$ are bonded in formula (1), $R^7$ denotes a hydrogen atom or a methyl group, the remainder of $R^1$ to $R^5$ are each independently selected from the group consisting of hydrogen atoms, alkyl groups and alkoxy groups having 1-6 carbon atoms, and $R^6$ denotes a hydrogen atom or a methyl group. In the epoxy (meth) acrylate compound, the content of halogen atoms is 100 ppm by mass or less. A curable composition for forming a protective film for an electrically conductive pattern obtained by mixing the epoxy (meth)acrylate compound with a photopolymerization initiator and at least one type of monomer or oligomer that contains a (meth)acryloyl group.

4 Claims, 3 Drawing Sheets

(56) References Cited

U.S. PATENT DOCUMENTS

2013/0116455 A1    5/2013  Arai et al.
2013/0133539 A1    5/2013  Yoshida

FOREIGN PATENT DOCUMENTS

| JP | 7-048424 A | 2/1995 |
| --- | --- | --- |
| JP | 7-304828 A | 11/1995 |
| JP | 10-511721 A | 11/1998 |
| JP | 2011-084558 A | 4/2011 |
| JP | 2012-150893 A | 8/2012 |
| JP | 2013-136240 A | 7/2013 |
| JP | 2014-191894 A | 10/2014 |
| WO | 2012/008308 A1 | 1/2012 |

OTHER PUBLICATIONS

International Search Report for PCT/JP2017/026644 dated Oct. 3, 2017 [PCT/ISA/210].
Notification of Reason for Refusal dated Feb. 3, 2020, issued by the Korean Intellectual Property Office in Korean Application No. 10-2018-7036496.

EPOXY (METH) ACRYLATE COMPOUND AND CURABLE COMPOSITION CONTAINING SAME

CROSS REFERENCE TO RELATED APPLICATIONS

This application is a National Stage of International Application No. PCT/JP2017/026644 filed Jul. 24, 2017, claiming priority based on Japanese Patent Application No. 2016-148390 filed Jul. 28, 2016.

TECHNICAL FIELD

The present disclosure relates to an epoxy (meth)acrylate compound and a curable composition containing the same.

BACKGROUND ART

In a case such that a conductive pattern formed on a substrate has a very small thickness, a technology to form an insulative thin film which protects the conductive pattern, may be required. As a material for such an insulative thin film, for example, the below-mentioned Patent Document 1 discloses an epoxy acrylate resin, and the Patent Document 2 discloses a feature of adding a gallic acid or propyl gallate to an acrylic resin-based binder (polymer, monomer, or oligomer).

PRIOR ARTS

Patent Document
Patent Document 1: Japanese Unexamined Patent Publication (Kokai) No. H7-48424
Patent Document 2: Japanese Unexamined Patent Publication (Kokai) No. 2014-191894

SUMMARY

However, the epoxy acrylate resin disclosed in Patent Document 1 is synthesized using an epoxy resin which is synthesized by ring-opening polymerization of epichlorohydrin. Further, triethyl-benzylammonium chloride is used for forming the epoxy acrylate resin. Therefore, some chlorine remains in the epoxy acrylate resin, which leads to a drawback that migration easily occurs in the conductive pattern.

With respect to the protective film using a gallic acid or propyl gallate, which is disclosed in Patent Document 2, the inventors of Patent Document 2 prepare a transparent conductive film by coating aqueous dispersion containing synthesized silver nanowires on an easily adhesive surface of a high-transparency PET film, and by drying and pressurizing the resultant; and prepare a conductive layer by forming a protective layer on the obtained transparent conductive film. According to the reliability test of the conductive layers, after the conductive layers were left for 500 hours under the conditions of 85° C. and 85% relative humidity, sheet resistance increase rates of a large number of conductive layers each having the protective layer formed thereon are 20% or more and less than 30% (refer to Table 1). Therefore, deterioration of the conductive pattern, migration at the time of electric field application, etc., are suspected.

One of the objectives of the present disclosure is to provide an epoxy (meth)acrylate compound that serves as a material for a protective film that is unlikely to cause migration in a conductive pattern, and a curable composition containing the epoxy (meth)acrylate compound.

The present disclosure includes the following aspects.

[1] An epoxy (meth)acrylate compound represented by Formula (1), and having a halogen atom content of 100 ppm by mass or less:

(wherein, at least one of $R^1$ to $R^5$ has a structure represented by Formula (2); the remainders of $R^1$ to $R^5$ are each independently selected from a group consisting of a hydrogen atom, an alkyl group having 1 to 6 carbon atoms, and an alkoxy group having 1 to 6 carbon atoms; and $R^6$ represents a hydrogen atom or a methyl group), (wherein, * represents a bonding position to a carbon atom that constitutes the benzene ring to which $R^1$ to $R^5$ are bonded in Formula (1); and $R^7$ represents a hydrogen atom or a methyl group).

[2] An epoxy (meth)acrylate compound according to above [1], wherein the epoxy (meth)acrylate compound is a compound represented by Formula (3) or Formula (4):

(wherein, $R^8$ represents a hydrogen atom or a methyl group), (wherein, $R^9$ represents a hydrogen atom or a methyl group).

[3] A curable composition comprising: an epoxy (meth) acrylate compound according to above [1] or [2], at least one of monomers and oligomers containing a (meth)acryloyl group, and a photopolymerization initiator.

According to the present disclosure, an epoxy (meth) acrylate compound that serves as a material for a protective film that is unlikely to cause migration in a conductive pattern, and an ink composition containing the epoxy (meth) acrylate compound, can be provided.

ASPECT OF DISCLOSURE

Hereinbelow, an aspect of the present disclosure (hereinbelow, referred to as an aspect) will be explained. In the present specification, a (meth)acrylate refers to an acrylate or a methacrylate, a (meth)acrylic acid refers to an acrylic acid or a methacrylic acid, and a (meth)acryloyl group refers to an acryloyl group or a methacryloyl group, respectively.

Epoxy (Meth)Acrylate Compound

An epoxy (meth)acrylate compound according to an aspect is characterized in: having a structure in which a plurality of epoxy groups bonded to a benzene ring through a carbon atom, or a carbon atom and an oxygen atom, are bonded to a carboxyl group of a (meth)acrylic acid; and having a halogen atom content of 100 ppm by mass or less. The plurality of epoxy groups are bonded to one benzene ring through a carbon atom, or a carbon atom and an oxygen atom.

The epoxy (meth)acrylate compound may be represented by the following general formula.

(1)

(wherein, at least one of $R^1$ to $R^5$ has a structure represented by Formula (2); the remainders of $R^1$ to $R^5$ are each independently selected from a group consisting of a hydrogen atom, an alkyl group having 1 to 6 carbon atoms, and an alkoxy group having 1 to 6 carbon atoms; and $R^6$ represents a hydrogen atom or a methyl group).

(2)

(wherein, * represents a bonding position to a carbon atom that constitutes the benzene ring to which $R^1$ to $R^5$ are bonded in Formula (1); and $R^7$ represents a hydrogen atom or a methyl group).

Preferable examples of the alkyl group and alkoxy group having 1 to 6 carbon atoms may include a methyl group, an ethyl group, an isopropyl group, a t-butyl group, a methoxy group, an ethoxy group, an isopropoxy group, a t-butoxy group, and the like. A specific example of the epoxy (meth) acrylate compound may be an eugenol-derived epoxy (meth) acrylate having the following structure.

(3)

(wherein, $R^8$ represents a hydrogen atom or a methyl group).

Further, another specific example may be a 2-allylphenol-derived epoxy (meth)acrylate having the following structure.

(4)

(wherein, $R^9$ represents a hydrogen atom or a methyl group).

In the present specification, each of the terms eugenol-derived and 2-allylphenol-derived refers to a starting material for synthesizing a corresponding epoxy compound, the starting material being a compound having a hydroxy group (alcohol or phenol).

The above-mentioned eugenol- or 2-allylphenol-derived epoxide is preferable as a compound that serves as a raw material, the compound having epoxy groups bonded to a benzene ring through a carbon atom, or a carbon atom and an oxygen atom. Both eugenol and 2-allylphenol are offered commercially and easily available. Further, the eugenol and 2-allylphenol each includes one allyl group bonded to a benzene ring, in a molecule, and thus, when another allyl group is further introduced, using the easily ignitable palladium carbon (Pd/C), as a catalyst, the use amount of the palladium carbon (Pd/C) can be reduced. By using such materials having a low epoxy equivalent, epoxy (meth) acrylate having a high acrylate functional group concentration can be produced, and a degree of crosslinkage of the cured coated film can be designed high. In addition, because the material contains a benzene ring, thanks to the π-interaction with an aromatic ring, an adhesion property to a substrate containing an aromatic ring, such as PET (polyethylene terephthalate), PEN (polyethylene naphthalate), PI (polyimide), etc., can be increased.

Preferably, the eugenol-derived epoxide or the 2-allylphenol-derived epoxide may be prepared by epoxidizing, with hydrogen peroxide, a carbon-carbon double bond constituting an allyl group in the allyl ether of the raw material, i.e., eugenol or 2-allylphenol, and thereby, a halogen-free epoxy compound can be obtained.

The eugenol-derived epoxide may be produced by the reaction represented by the following Formula (5), using, for example, an allyl ether compound of eugenol, as a raw material.

(5)

Also, the 2-allylphenol-derived epoxide may be produced by the reaction represented by the following Formula (6), using, for example, an allyl ether compound of 2-allylphenol, as a raw material.

(6)

As a source for hydrogen peroxide, a hydrogen peroxide aqueous solution is preferable. The concentration of the hydrogen peroxide aqueous solution is not limited, but in general, preferably 1 to 60% by mass, more preferably 5 to 50% by mass, and still more preferably 10 to 40% by mass. The concentration of 1% by mass or more is preferable from the viewpoint of industrial productivity, and from the viewpoint of energy-cost at the time of separation. The concentration of 60% by mass or less is preferable from the viewpoints of economy and safety.

The amount of hydrogen peroxide usage is not particularly limited. As the reaction progresses, the hydrogen peroxide is consumed. Thus, maintaining the concentration in the reaction system by continuously adding and replenishing hydrogen peroxide, is desirable. The concentration of the hydrogen peroxide present in the reaction system is maintained preferably 0.01 to 0.5 molar equivalent, more preferably 0.02 to 0.2 molar equivalent, and still more preferably 0.05 to 0.1 molar equivalent, relative to the carbon-carbon double bonds in the allyl ether compound of the raw material. If the concentration of the hydrogen peroxide present in the reaction system is 0.01 molar equivalent or more, relative to the carbon-carbon double bonds in the allyl ether compound of the raw material, productivity is preferable. If the concentration is 0.5 molar equivalent or less, a sufficient safety can be ensured even in a mixed composition of a solvent and water. At the early stage of the reaction, if a large amount of hydrogen peroxide is supplied in the reaction system at a time, the reaction may progress too rapidly, leading to a dangerous situation. Therefore, as mentioned below, adding the hydrogen peroxide slowly is preferable. The hydrogen peroxide concentration in the reaction system at the end of the reaction is not limited, and the concentration of the hydrogen peroxide present in the reaction system may be 0.01 molar equivalent or less, relative to the concentration of the carbon-carbon double bonds in the allyl ether compound of the raw material.

In the above reaction, acetonitrile is used for epoxidizing the allyl group, with hydrogen peroxide, in coexistence with base. The hydrogen peroxide acts on acetonitrile, and a peroxy imidic acid which is active on the oxidation reaction is formed. The oxidation reaction progresses with the peroxy imidic acid serving as reaction active species. According to this method, the reaction can be performed under the neutral or basic condition. Therefore, the method has broad utility, and is advantageous in cost because the use of special test reagent is not required.

The amount of acetonitrile provided at the start of the reaction is preferably, in terms of nitrile group, 2.0 to 15 molar equivalent, more preferably 3.0 to 10 molar equivalent, and still more preferably 4.0 to 8.0 molar equivalent, relative to the carbon-carbon double bonds in the allyl ether compound of the raw material. Although depending on the structure of the allyl ether compound of the raw material, if the amount of acetonitrile used is 2 to 15 molar equivalent, in terms of nitrile group in acetonitrile, relative to the carbon-carbon double bonds in the allyl ether compound of the raw material, the reaction liquid can easily become a homogeneous phase, which is preferable. Further, if the amount of nitrile groups in acetonitrile is 2 molar equivalent or more, the percent yield is preferable, and if the amount is 15 molar equivalent or less, the epoxidation selectivity of the hydrogen peroxide, and the cost are preferable.

Acetonitrile can be additionally supplied during the reaction. When acetonitrile is added, the ratio of the total amount of acetonitrile relative to the total amount of the allyl ether compound of the raw material (acetonitrile/carbon-carbon double bonds in allyl ether compound of the raw material (molar ratio)) should be in the above range, namely, preferably 2.0 to 15, more preferably 3.0 to 10, and still more preferably 4.0 to 8.0.

When an epoxidation reaction is performed under the presence of acetonitrile, preferably, a proton-donor solvent is coexisted in the reaction liquid, and the hydrogen peroxide acts on the allyl ether compound of the raw material, under the presence of the proton-donor solvent. The proton-donor solvent functions as a solvent for the allyl ether compound of the raw material. When the allyl ether compound of the raw material has a high viscosity, the proton-donor solvent also functions as a viscosity depressant to increase the moving speed of the hydrogen peroxide toward the allyl ether compound of the raw material.

Specific examples of the proton-donor solvent may include alcohol, amine, thiol, etc. These proton-donor solvents may be used in combination. Among them, alcohol is preferable, particularly when the allyl ether compound of the raw material has low hydrophilicity, because alcohol has a function to suppress the separation of the organic phase including the allyl ether compound of the raw material and acetonitrile, and the aqueous phase including the hydrogen peroxide, so as to make the reaction liquid to a homogeneous phase and increase the reaction rate. Among alcohols, an alcohol having 1 to 4 carbon atoms is preferable, a primary alcohol having 1 to 4 carbon atoms is more preferably, and methanol, ethanol, and 1-propanol are still more preferable.

Usage of the proton-donor solvent, relative to 100 parts by mass of the allyl ether compound of the raw material, is preferably 10 to 1000 parts by mass, more preferably 80 to 800 parts by mass, and still more preferably 100 to 500 parts by mass. Usage of the proton-donor solvent varies depending on the structure of the allyl ether compound of the raw material, and thus, cannot be generally determined. However, using 10 to 1000 parts by mass of the proton-donor solvent relative to 100 parts by mass of the allyl ether compound of the raw material, is preferable, because the reaction liquid can easily be a homogeneous phase. Further, if the usage of the proton-donor solvent is 10 parts by mass or more and 1000 parts by mass or less, relative to 100 parts by mass of the allyl ether compound of the raw material, the reaction rate is preferable.

Usage of the proton-donor solvent, relative to 100 parts by mass of acetonitrile is preferably 20 to 500 parts by mass, more preferably 25 to 400 parts by mass, and still more preferably 33 to 300 parts by mass. When the allyl ether compound of the raw material has higher hydrophobicity, and has higher solubility to an organic solvent such as acetonitrile, increasing the ratio of acetonitrile is preferable. Namely, performing the reaction, while the usage of the proton-donor solvent is made closer to 20 parts by mass, relative to 100 parts by mass of acetonitrile, is preferable.

The reaction liquid containing the allyl ether compound of the raw material, has a pH, at any selected point, of preferably 8 to 12, more preferably 9 to 11, and still more preferably 9.5 to 11. If the pH is 8 or more, the reaction rate is preferable, and high productivity can be maintained. If the pH is 12 or less, sufficient safety can be secured during the reaction and a sufficient percent yield can be obtained. Since hydrogen peroxide actively decomposes under a high-alkaline atmosphere, controlling the pH of the reaction liquid to around 9 to 10 at the initial stage of the reaction, and then, controlling the pH to around 10 to 11 by gradually increasing the pH along with the addition of the hydrogen peroxide, in accordance with needs, is more preferable.

In order to adjust the pH of the reaction liquid, an alkaline compound may be used, so that the hydrogen peroxide acts on the allyl ether compound of the raw material, under the presence of the alkaline compound. Examples of the alkaline compound which can be used for adjusting the pH of the reaction liquid may include salts of inorganic bases such as potassium carbonate, potassium hydrogen carbonate, potassium hydroxide, sodium hydroxide, cesium hydroxide, etc., and salts of organic bases such as potassium methoxide, potassium ethoxide, sodium methoxide, sodium ethoxide, tetramethylammonium hydroxide, etc. Among them, potassium carbonate, potassium hydrogen carbonate, potassium hydroxide, sodium hydroxide, potassium methoxide, potassium ethoxide, sodium methoxide, and sodium ethoxide are preferable because the pH adjustment is easy. Further, potassium hydroxide and sodium hydroxide are more preferable because they have high solubility to water and alcohol, and superior reactivity.

The alkaline compound may be used by dissolving the alkaline compound in water or in a solution of a proton-donor solvent, and using the alkaline compound in such a way is preferable. A preferable proton-donor solvent is alcohol, such as methanol, ethanol, propanol, butanol, etc. Using a proton-donor solvent same as the above-mentioned proton-donor solvent is preferable. Preferably, the solution of the alkaline compound should be added so that the reaction liquid maintains its pH 9 more, even if the hydrogen peroxide is added.

The order and the state of adding the allyl ether compound of the raw material, hydrogen peroxide, acetonitrile, the proton-donor solvent, and the alkaline compound, to the reaction system are not particularly limited. However, in view of the stability in industrial production, preferably, the allyl ether compound of the raw material, acetonitrile, and the proton-donor solvent are supplied to a reactor first, the reaction temperature is maintained as much as possible, and the hydrogen peroxide aqueous solution is gradually added while confirming that hydrogen peroxide is consumed in the reaction. This is preferable because the epoxidation reaction can be accelerated, and a reaction product can be easily separated and purified. According to this method, even if abnormal decomposition of the hydrogen peroxide occurs and oxygen gas is generated in the reactor, since the accumulated amount of the hydrogen peroxide in the reactor is small, the increase of pressure can be suppressed to the lowest level.

The reaction is performed in the homogeneous phase. When the reaction liquid is in the homogeneous phase, the allyl ether compound of the raw material can be efficiently reacted with hydrogen peroxide and acetonitrile which are required for epoxidation, without the phase transfer. Therefore, less unreacted materials remains after the reaction, and the objective epoxide can be produced at a high percent yield. The ratio of the components required for making the reaction liquid to a homogeneous phase may change depending on the structure of the allyl ether compound of the raw material, and thus, cannot be determined. However, as mentioned above, the ratio can be adjusted by appropriately changing the amounts of acetonitrile and/or the proton-donor solvent.

As mentioned above, the reaction liquid preferably has a pH of 8 to 12, at any selected point. The timing for adding the alkaline compound which is an optional component for adjusting the pH of the liquid, is not limited. A predetermined amount of the alkaline compound may be initially supplied to the reactor. In this case, addition during the reaction is not always necessary. The alkaline compound may not be supplied initially, and may be only added during the reaction. Since hydrogen peroxide actively decomposes under a high-alkaline atmosphere, controlling the pH to around 9 to 10 at the initial stage of the reaction, and then, controlling the pH to around 10 to 11 by gradually increasing the pH along with the addition of the hydrogen peroxide, in accordance with needs, is more preferable.

The reaction temperature is preferably 0° C. to 60° C., more preferably 10° C. to 50° C., and still more preferably 20° C. to 40° C. If the reaction temperature is 0° C. or higher, the reaction progresses favorably, and if the reaction temperature is 60° C. or lower, volatilization or boiling of acetonitrile and the proton-donor solvent can be suppressed.

The reaction time depends on the reaction temperature, and cannot be determined unconditionally, but is normally 2 to 100 hours, preferably 4 to 80 hours, and more preferably 6 to 60 hours.

After the reaction is complete, an organic phase containing the reaction product is collected and condensed to obtain a crude reaction product. The reaction liquid normally contains hydrogen peroxide. Thus, in case that the organic phase containing the reaction product is collected after the moisture in the reaction liquid is removed, removing the hydrogen peroxide by reduction in advance is preferable, in order to avoid the risk of explosion due to the condensation of the hydrogen peroxide. The reducing agent used for the removal by reduction may be sodium sulfite, sodium thiosulfate, etc., but is not limited thereto. Further, when the organic phase containing the reaction product is collected, in order to efficiently separating and removing the moisture in the reaction liquid, from the organic phase containing the reaction product, adding an appropriate amount of an organic solvent having low compatibility with water to the reaction liquid, is preferable. Examples of the organic solvent may include toluene, ethyl acetate, dichloromethane, etc., but are not limited to these organic solvents. According to these processes, hydrogen peroxide remaining in the reaction liquid may be removed, and the aqueous phase can be separated from the organic phase containing the organic solvent.

As mentioned above, the organic phase is separated from the aqueous phase, condensed, and then, subjected to an ordinary method such as distillation, separation with chromatography, recrystallization, sublimation, etc. Thus, the generated epoxide of the allyl ether compound of the raw material, can be extracted.

When the eugenol-derived epoxide produced as above is reacted with a (meth)acrylic acid (Formula (7)), eugenol-derived epoxy (meth)acrylate, which is an epoxy (meth) acrylate compound according to an aspect, can be produced.

(wherein, $R^8$ represents a hydrogen atom or a methyl group).

Also, when the above-mentioned 2-allylphenol-derived epoxide is reacted with a (meth) acrylic acid (Formula (8)), 2-allylphenol-derived epoxy (meth)acrylate, which is an epoxy (meth)acrylate compound according to an aspect, can be produced.

(wherein, $R^9$ represents a hydrogen atom or a methyl group).

When a (meth) acrylic acid is added to an epoxide, reaction can be performed without a solvent, or by using a solvent. The solvent is not limited, as far as the solvent does not inhibit the reaction. Examples of the solvent can include an ester-based solvent such as propyleneglycol monomethyl ether acetate, diethyleneglycol monoethyl ether acetate, etc. Examples of the catalyst for the reaction between the epoxide and the (meth) acrylic acid can include a phosphine-based catalyst such as triphenylphosphine, tributylphosphine, etc., a tertiary amine-based catalyst such as diazabicycloundecene, etc., and an imidazole-based catalyst such as ethylimidazole, etc. Further, in order to prevent polymerization of (meth)acryloyl groups during the reaction, a polymerization inhibitor such as hydroquinone, hydroquinone monomethyl ether, phenothiazine, 2,6-di-t-butyl-p-cresol, etc., can be used.

The conditions for the reaction between the epoxide and the (meth) acrylic acid may include a reaction temperature of 20° C. to 180° C., preferably 50° C. to 150° C., and more preferably 60° C. to 130° C., and a reaction time of 1 to 24 hours. The reaction is ended when the acid value becomes 5 or less. The addition amount of the (meth) acrylic acid relative to the epoxide, in terms of the epoxy group in the epoxide, is preferably 1 to 2 equivalents, and more preferably 1 to 1.5 equivalents. The reaction may progress without a reaction catalyst. However, when a reaction catalyst is used, the usage of the reaction catalyst is preferably 0.1 to 2 parts by mass, relative to 100 parts by mass of the (meth) acrylic acid. When a polymerization inhibitor is used, the usage of the polymerization inhibitor is preferably 0.01 to 1 parts by mass, relative to 100 parts by mass of the (meth) acrylic acid.

Curable Composition

A curable composition according to an aspect comprises the above-mentioned epoxy (meth)acrylate compound, a photopolymerization initiator, and at least one of monomers and oligomers having a (meth)acryloyl group. The photopolymerization initiator is not limited, but a photo-radical initiator is preferable from a viewpoint of high reactivity to ultraviolet rays. Examples of the photo-radical initiator may include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 2,2-diethoxyacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chloro thioxanthone, 2,2-dimethoxy-1,2-diphenylethan-1-one (IRGACURE (registered trademark) 651, manufactured by BASF Japan Ltd.), 1-hydroxy-cyclohexyl-phenyl ketone (IRGACURE (registered trademark) 184, manufactured by BASF Japan Ltd.), 2-hydroxy-2-methyl-1-phenyl propan 1-one (DAROCUR (registered trademark) 1173, manufactured by BASF Japan Ltd.), 1-[4-(2-hydroxyethoxy)-phenyl]-2-hydroxy-2-methyl-1-propan 1-one (IRGACURE (registered trademark) 2959, manufactured by BASF Japan Ltd.), 2-methyl-1-[4-(methylthio)phenyl]-2-morpholinopropan-1-one (IRGACURE (registered trademark) 907, manufactured by BASF Japan Ltd.), 2-benzyl-2-dimethylamino-1-(4-morpholinophenyl)-butanone-1 (IRGACURE (registered trademark) 369, manufactured by BASF Japan Ltd.), 2-(4-methylbenzyl)-2-dimethylamino-1-(4-morpholin-4-yl-phenyl)-butan-1-one (IRGACURE (registered trademark) 379, manufactured by BASF Japan Ltd.), dibenzoyl, and the like.

Among them, α-hydroxy ketone compounds (for example, benzoin, benzoin methyl ether, benzoin butyl ether, 1-hydroxy-cyclohexyl phenyl ketone, etc.), and phenyl ketone derivatives (for example, acetophenone, propiophenone, benzophenone, 3-methylacetophenone, 4-methylacetophenone, 3-pentylacetophenone, 2,2-diethoxyacetophenone, 4-methoxyacetophenone, 3-bromoacetophenone, 4-allylacetophenone, 3-methoxybenzophenone, 4-methylbenzophenone, 4-chlorobenzophenone, 4,4'-dimethoxybenzophenone, 4-chloro-4'-benzylbenzophenone, bis(4-dimethylaminophenyl)ketone, etc.), are preferable.

When each of the above epoxy (meth)acrylate compounds obtained according to the above-mentioned methods is contained in an epoxy (meth)acrylate composition which is used for a protective film of a conductive pattern, occurrence of migration can be suppressed. The composition may be a mixture of each epoxy (meth)acrylate compound, a monomer or an oligomer having a (meth)acryloyl group, and a photopolymerization initiator. The mixing ratio in the composition varies depending on the forming methods of the protective film of the composition, but can be 20 to 90 parts by mass of the epoxy (meth)acrylate compound; 10 to 80 parts by mass of the monomer or the oligomer having a (meth)acryloyl group; and 1 to 5 parts by mass of a photopolymerization initiator relative to 100 parts by mass of the total of the epoxy (meth)acrylate compound and the monomer or the oligomer having a (meth)acryloyl group.

Examples of the monomer or oligomer having a (meth)acryloyl group may include trimethylol propane triacrylate, neopentyl glycol polypropoxy diacrylate, neopentyl glycol diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl)isocyanurate polyhexanolide triacrylate, tricyclodecane dimethylol diacrylate, 2-(2-acryloyloxy-1,1-dimethyl)-5-ethyl-5-acryloyloxymethyl-1,3-dioxane, tetrabromo bisphenol A diethoxydiacrylate, 4,4-dimercapto diphenyl sulfide dimethacrylate, poly tetraethylene glycol diacrylate, 1,9-nonanediol diacrylate, 1,6-hexanediol diacrylate, dimethylol tricyclodecane diacrylate, ditrimethylol propane tetraacrylate, tetramethylol methane tetraacrylate, pentaerythritol triacrylate, pentaerythritol tetraacrylate, dipentaerythritol monohydroxy pentaacrylate, dipentaerythritol hexaacrylate, 1,4-butylene glycol diacrylate, polyethylene glycol diacrylate, commercially offered oligoester acrylate, aromatic-, aliphatic-, etc., urethane acrylate (oligomer), and the like.

Further, the above composition may include a solvent. Examples of this solvent are solvents which can be used for synthesizing the above-mentioned epoxy (meth)acrylate compound.

Further, if the epoxide used as a raw material at the production stage is a halogen-free epoxide as mentioned above, the amount of halogen contained, as impurities, in the produced epoxy (meth)acrylate compound, can be largely reduced. Therefore, the epoxy (meth)acrylate compound has a halogen atom content of 100 ppm by mass or less, and preferably 50 mass ppm or less, more preferably 30 mass ppm or less, and still more preferably 15 mass ppm.

EXAMPLES

Hereinafter, specific examples of the present disclosure will be explained. The examples are described below for the purpose of easy understanding of the present disclosure, and the present disclosure is not limited to these examples.

<Acid Value Measurement Method>

In the present Examples, acid values are values measured by the following method.

Approximately 0.2 g of a sample was precisely weighed, by a precision balance, into a 100 mL conical flask, and 10 mL of mixture solvent having ethanol/toluene=½ (mass ratio) was added thereto to dissolve the sample. Further, 1 to 3 drops of phenolphthalein ethanol solution were added to the container as an indicator, which was sufficiently stirred until the sample was uniformly mixed. The mixture was subjected to titration with a 0.1 N potassium hydroxide-ethanol solution, and the end of neutralization was determined by the fact that the slight red color of the indicator continues for 30 seconds. The value obtained from the result, using the following calculation formula, was determined as an acid value of the sample.

Acid Value (mgKOH/g)=[$B \times f \times 5.611$]/$S$

B: Use quantity of 0.1 N potassium hydroxide-ethanol solution (mL)
f: Factor of 0.1 N potassium hydroxide-ethanol solution
S: Collection quantity of sample (g)

<Viscosity Measurement Method>

In the present Examples, viscosities are values measured by the following method.

Using a B-type viscometer DV-II+Pro, manufactured by Brookfield Engineering, the viscosity of a sample was measured at 25° C. When the viscosity exceeds 10000 mPa·s, Rotor No. 52 was used for measurement, and when the viscosity is 10000 mPa·s or less, Rotor No. 40 was used for measurement, respectively.

<Epoxy Equivalent Measurement Method>

Epoxy equivalents were measured according to JIS K7236:2001.

Raw Material Synthesis Example 1

Synthesis of Substrate (2-Allylphenol Allyl Ether)

A solution prepared by dissolving 567 g (4.10 mol) of potassium carbonate (manufactured by Nippon Soda, Co., Ltd.) in 750 g of pure water, and 500 g (3.73 mol) of 2-allylphenol (manufactured by Tokyo Chemical Industry, Co., Ltd.) represented by Formula (9) were added in a 3 L three-neck round-bottom flask, and the reactor was subjected to nitrogen gas replacement and heated to 85° C. Under a nitrogen stream, 448 g (4.47 mol) of allyl acetate (manufactured by Showa Denko K.K.), 9.77 g (37.3 mmol) of triphenylphosphine (manufactured by Hokko Chemical Industry Co., Ltd.), and 3.17 g (0.750 mmol (in terms of Pd atom)) of 50% wetted-with-water 5%-Pd/C-STD type (manufactured by N.E. Chemcat Corporation) were added in the reactor, and under a nitrogen gas atmosphere, the temperature of the reactor was raised to 105° C. to continue the reaction for four hours. Thereafter, 44.8 g (0.447 mol) of allyl acetate was further added, and the resultant was continued to be heated for 12 hours. After the reaction was complete, the reaction system was cooled to a room temperature, and then, pure water was added thereto until all of the precipitated salt was dissolved, and the resultant was subjected to a separation treatment. The organic phase was separated, and the organic solvent (70° C., 50 mmHg, 2 hours) was distilled away. Pure water (500 g) was added, and thereafter, 500 g of toluene was added, which was maintained at a temperature of 80° C. or higher. After confirmation that no white precipitate appeared, Pd/C was filtered (using a 1 micron membrane filter KST-142-JA (manufactured by Advantech Co., Ltd.), while applying pressure (0.3 MPa)) and collected. The filter cake was washed with 100 g of toluene, and the aqueous phase was separated. The organic phase was washed twice, with 500 g of pure water, at 50° C. or higher, and the aqueous phase was confirmed as neutral. The organic phase was separated, and thereafter, condensed under reduced pressure, to thereby obtain a pale yellow liquid (669 g, 3.66 mol, 98.0% percent yield) mainly composed of an allyl ether compound of 2-allylphenol represented by Formula (10). According to the $^1$H-NMR measurement of the pale yellow liquid, the compound represented by Formula (10) was contained as a main component. The measurement data attributed to the compound represented by Formula (10) is shown below.

$^1$H-NMR {400 MHz, CDCl$_3$, 27° C.}, δ3.32 (2H, dt, PhC$\underline{H}_2$CH=CH$_2$), δ4.54 (2H, dt, PhOC$\underline{H}_2$CH=CH$_2$), δ5.01-5.09 (2H, m, PhCH$_2$CH=C$\underline{H}_2$), δ5.27 (1H, dq, PhOCH$_2$CH=CH$\underline{H}$), δ5.42 (1H, dq, PhOCH$_2$CH=C$\underline{H}$H), δ5.95 (1H, m, PhCH$_2$C$\underline{H}$=CH$_2$), δ6.06 (1H, m, PhOCH$_2$C$\underline{H}$=CH$_2$), δ6.92 (m, 2H, aromatic), δ7.09 (2H, m, aromatic).

(9)

(10)

Raw Material Synthesis Example 2

Synthesis of Substrate (Eugenol Allyl Ether)

The reaction was performed under the same conditions as the Raw Material Synthesis Example 1, except that 2-allylphenol was changed to eugenol. The amounts of substance of the reagents used in the reaction, and the physical property data of the obtained allyl ether, are shown below.

A solution prepared by dissolving 463 g (3.35 mol) of potassium carbonate (manufactured by Nippon Soda, Co., Ltd.) in 750 g of pure water, and 500 g (3.04 mol) of eugenol (manufactured by Tokyo Chemical Industry, Co., Ltd.) represented by Formula (11) were added in a 3 L three-neck round-bottom flask, and the reactor was subjected to nitrogen gas replacement and heated to 85° C. Under a nitrogen stream, 366 g (3.65 mol) of allyl acetate (manufactured by Showa Denko K.K.), 8.00 g (30.5 mmol) of triphenylphosphine (manufactured by Hokko Chemical Industry Co., Ltd.), and 2.59 g (0.610 mmol (in terms of Pd atom)) of 50% wetted 5%-Pd/C-STD type (manufactured by N.E. Chemcat Corporation) were added in the reactor, and under a nitrogen gas atmosphere, the temperature of the reactor was raised to 105° C. to continue the reaction for four hours. Thereafter, 36.6 g (0.365 mol) of allyl acetate was further added, which was continued to be heated for 12 hours. After the reaction was complete, the reaction system was cooled to a room temperature, and then, pure water was added thereto until all of the precipitated salt was dissolved, and the resultant was subjected to a separation treatment. The organic phase was separated, and the organic solvent (70° C., 50 mmHg, 2 hours) was distilled away. Pure water (500 g) was added, and thereafter, 500 g of toluene was added, which was maintained at a temperature of 80° C. or higher. After confirmation that no white precipitate appeared, Pd/C was filtered (using a 1 micron membrane filter KST-142-JA (manufactured by Advantech Co., Ltd.), while applying pressure (0.3 MPa)) and collected. The filter cake was washed with 100 g of toluene, and the aqueous phase was separated. The organic phase was washed twice, with 500 g of pure water, at 50° C. or higher, and the aqueous phase was confirmed as neutral. The organic phase was separated, and thereafter, condensed under reduced pressure, to thereby obtain a pale yellow liquid (611 g, 2.99 mol, 98.5% percent yield) mainly composed of an allyl ether compound of eugenol represented by Formula (12).

(11)

(12)

Synthesis Example 1

Figure 1:
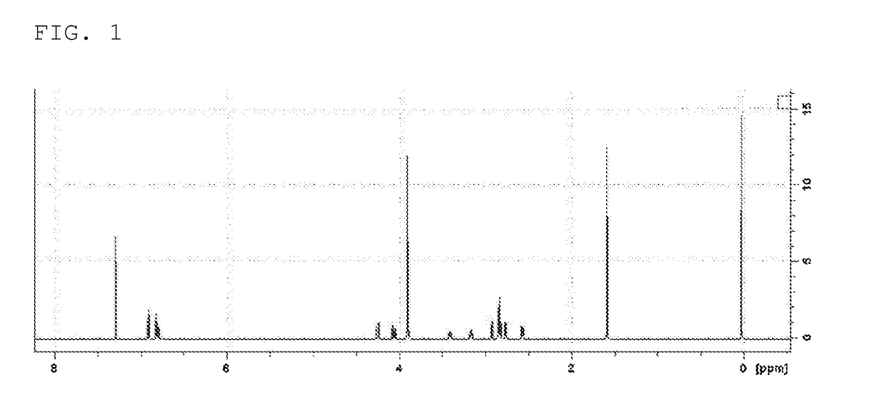
FIG. 1 shows a $^1$H-NMR spectrum of an eugenol-derived epoxide synthesized according to Synthesis Example 1.

Synthesis of Eugenol-Derived Epoxide 300 g (1.47 mol) of the allyl ether compound of eugenol obtained by the above-mentioned Raw Material Synthesis Example 2, 707 g (17.2 mol) of acetonitrile (manufactured by Junsei Chemical Co., Ltd.), and 1240 g (38.6 mol) of methanol (manufactured by Junsei Chemical Co., Ltd.) were added in a 5 L three-neck flask, and a small amount of 50%-by-mass potassium hydroxide aqueous solution (manufactured by Wako Pure Chemical Corporation) was added thereto to adjust the pH of the resultant reaction liquid to approximately 10.5. Thereafter, 1040 g (9.18 mol) of 30%-by-mass hydrogen peroxide aqueous solution (manufactured by Mitsubishi Gas Chemical Company Inc.) was dropped at an inner temperature of 35° C. The dropping took 18 hours, and during the dropping, the inner temperature was kept so as not to exceed 45° C. The addition of the hydrogen peroxide aqueous solution resulted in lowering the pH. Thus, a 50%-by-mass potassium hydroxide aqueous solution was also added in order to keep the pH to 9.0 to 11. After the reaction, 500 g of 10% sodium sulfite aqueous solution (prepared by dissolving sodium sulfite, manufactured by Wako Pure Chemical Corporation, in pure water), and 750 g of toluene were added, which was stirred for 30 minutes at a room temperature. The aqueous phase was separated, and thereafter, the organic phase was washed twice with 500 g of pure water, to distill the solvent away. Thereby, a reaction product (objective product) was obtained. The obtained eugenol-derived epoxide (EUGG) had an epoxy equivalent of 122 g/eq. FIG. 1 shows a result of the $^1$H-NMR measurement of the obtained product. According to FIG. 1, it was confirmed that a compound represented by Formula (13) was contained as a main component.

(13)

Synthesis Example 2

Figure 2:
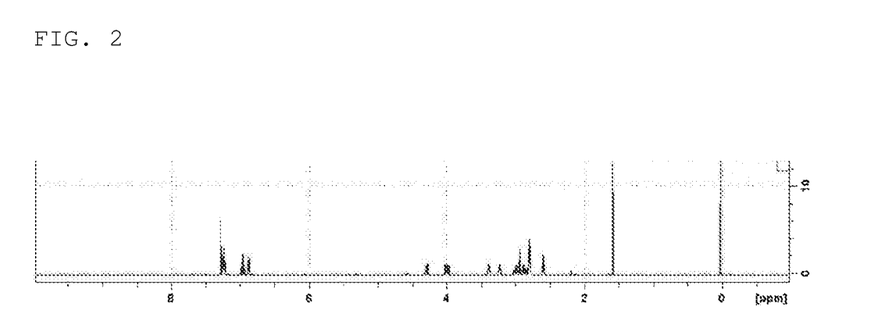
FIG. 2 shows a $^1$H-NMR spectrum of a 2-allylphenol-derived epoxide synthesized according to Synthesis Example 2.

Synthesis of 2-Allylphenol-Derived Epoxide 300 g (1.72 mol) of the allyl ether compound of 2-allylphenol obtained by the above-mentioned Raw Material Synthesis Example 1, 980 g (23.9 mol) of acetonitrile (manufactured by Junsei Chemical Co., Ltd.), and 330 g (10.3 mol) of methanol (manufactured by Junsei Chemical Co., Ltd.) were added in a 5 L three-neck flask, and a small amount of 50%-by-mass potassium hydroxide aqueous solution (manufactured by Wako Pure Chemical Corporation) was added thereto to adjust the pH of the resultant reaction liquid to approximately 10.5. Thereafter, 1170 g (10.3 mol) of 30%-by-mass hydrogen peroxide aqueous solution (manufactured by Mitsubishi Gas Chemical Company Inc.) was dropped at an inner temperature of 35° C. The dropping took 18 hours, and during the dropping, the inner temperature was kept so as not to exceed 45° C. The addition of the hydrogen peroxide aqueous solution resulted in lowering the pH. Thus, a 50%-by-mass potassium hydroxide aqueous solution was also added in order to keep the pH to 9.0 to 11. After the reaction, 500 g of 10%-by-mass sodium sulfite aqueous solution (prepared by dissolving sodium sulfite, manufactured by Wako Pure Chemical Corporation, in pure water), and 750 g of toluene were added, which was stirred for 30 minutes at a room temperature. The aqueous phase was separated, and thereafter, the organic phase (toluene) was washed twice with 500 g of pure water, to distill the solvent away. Thereby, a reaction product (objective product) was obtained. The obtained 2-allylphenol-derived epoxide (2APG) had an epoxy equivalent of 112 g/eq. FIG. 2 shows a result of the $^1$H-NMR measurement of the obtained product. According to FIG. 2, it was confirmed that a compound represented by Formula (14) was contained as a main component.

(14)

Synthesis Example 3

Synthesis of Eugenol-Derived Epoxide

According to Polym Int 2014; 63: 760-765, EUGG was synthesized.

Synthesis Example 4

Synthesis of 2-Allylphenol-Derived Epoxide

According to U.S. Pat. No. 2,965,607, 2APG was synthesized.

Example 1

Synthesis of Eugenol-Derived Epoxy Acrylate (EUGG Acrylate)

50.1 g (epoxy group considering epoxy equivalent: 0.205 mol) of eugenol-derived epoxide (EUGG) synthesized by Synthesis Example 1, 0.016 g of phenothiazine (manufactured by Wako Pure Chemical Corporation), and 0.264 g of triphenylphosphine (manufactured by Hokko Chemical Industry Co., Ltd.) were added in a flask, and stirred at 70° C. Then, 29.8 g (0.414 mol) of acrylic acid (manufactured by Showa Denko K.K.) was slowly dropped thereto. After the dropping, the temperature was raised to 120° C., and stirred. Sampling was performed at appropriate times and the acid values were measured. When 4 hours passed, the acid value became 5 or less, and at that time, the reaction was ended. The actual yield was 72.5 g, the percent yield was 93.0%, the acid value was 2.3, and the viscosity was 139000 Pa-s.

Figure 3:
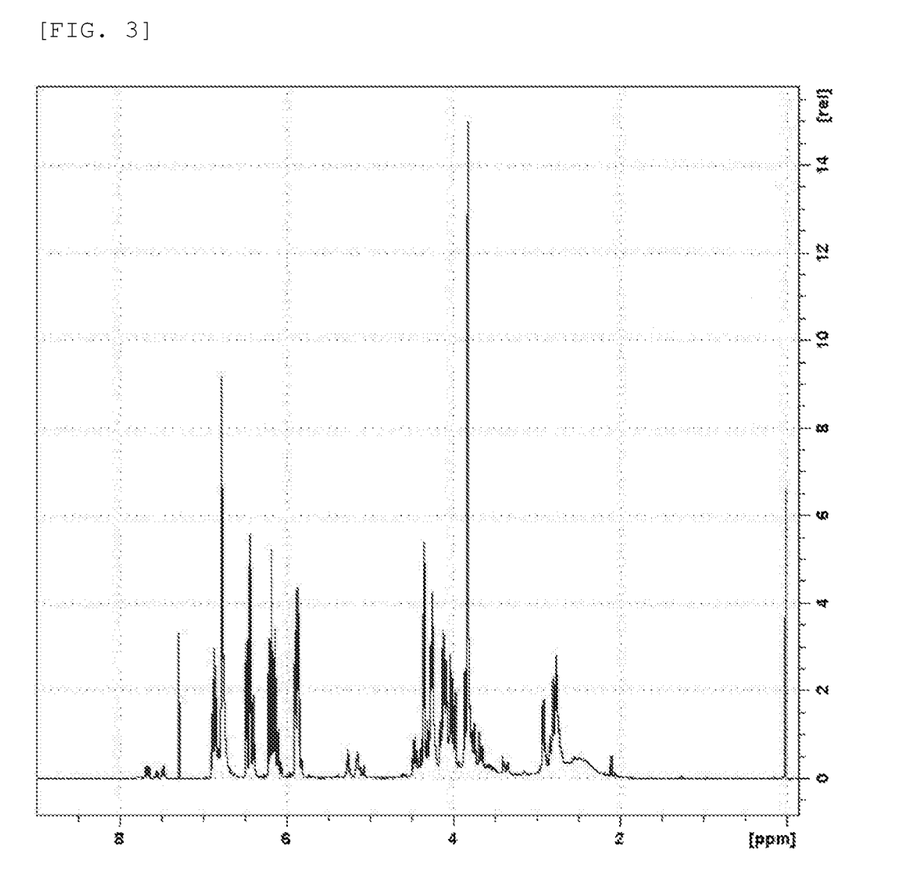
FIG. 3 shows a $^1$H-NMR spectrum of an eugenol-derived epoxy acrylate according to Example 1.

The obtained compound was identified by $^1$H-NMR. FIG. 3 shows the above-mentioned $^1$H-NMR spectrum. In FIG. 3, the peaks around 3.2 ppm and 2.6 ppm derived from epoxy groups and shown in FIG. 1, disappear; and new peaks around 5.9 ppm to 6.4 ppm derived from acryloyl groups are found. Thereby, the synthesis of EUGG acrylate represented by Formula (15) can be confirmed.

(15)

Further, signals in the $^1$H-NMR spectrum of the obtained EUGG acrylate are as follows:

7.3 ppm (s, 1H), 6.9 ppm (t, 1H), 6.8 ppm (s, 1H), 6.4 ppm (m, 2H), 6.2 ppm (m, 2H), 5.9 ppm (m, 2H), 4.5 ppm (q, H), 4.3 ppm (m, 2H), 4.1 ppm (m, 2H), 3.8 ppm (s, 3H), 2.9 ppm (d, H), 2.8 ppm (m, 2H).

Example 2

Synthesis of 2-Allylphenol-Derived Epoxy Acrylate (2APG Acrylate)

50.0 g (epoxy group considering epoxy equivalent: 0.223 mol) of 2-allylphenol-derived epoxide (2APG) synthesized by Synthesis Example 2, 0.016 g of phenothiazine (manufactured by Wako Pure Chemical Corporation), and 0.260 g g of triphenylphosphine (manufactured by Hokko Chemical Industry Co., Ltd.) were added in a flask, and stirred at 70° C. Then, 32.6 g (0.452 mol) of acrylic acid (manufactured by Showa Denko K.K.) was slowly dropped thereto. After the dropping, the temperature was raised to 120° C., and stirred.

Sampling was performed at appropriate times and the acid values were measured. When 5 hours passed, the acid value became 5 or less, and at that time, the reaction was ended. The actual yield was 73.0 g, the percent yield was 93.4%, the acid value was 3.7, and the viscosity was 125000 mPa·s.

Figure 4:
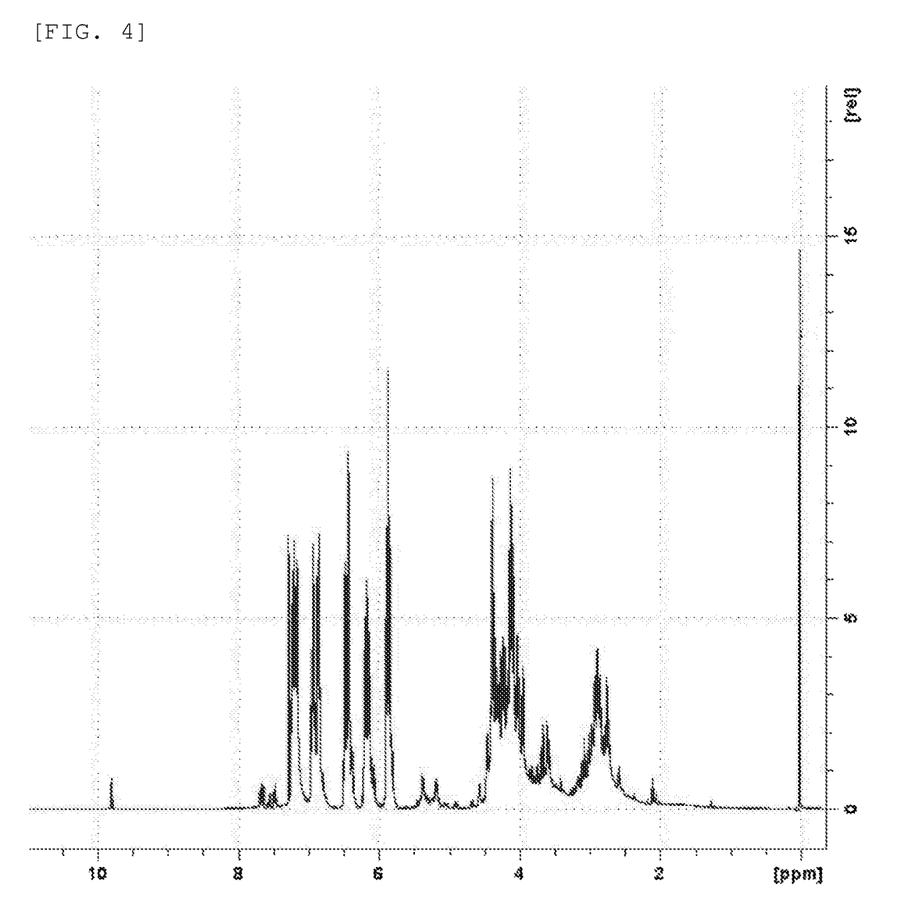
FIG. 4 shows a $^1$H-NMR spectrum of a 2-allylphenol-derived epoxy acrylate according to Example 2.

The obtained compound was identified by $^1$H-NMR. FIG. 4 shows the above-mentioned $^1$H-NMR spectrum. In FIG. 4, the peaks around 3.2 ppm and 2.6 ppm derived from epoxy groups and shown in FIG. 2, disappear; and new peaks around 5.9 ppm to 6.5 ppm derived from acryloyl groups are found. Thereby, the synthesis of 2APG acrylate represented by Formula (16) can be confirmed.

(16)

Further, signals in the $^1$H-NMR spectrum of the obtained 2APG acrylate are as follows:

7.5 ppm (t, 1H), 7.3 ppm (s, 1H), 7.2 ppm (m, 1H), 6.9 ppm (dq, 1H), 6.5 ppm (q, 2H), 6.2 ppm (q, 2H), 5.9 ppm (t, 2H), 4.4 ppm (m, 2H) 4.1 ppm (m, 2H), 3.6 ppm (m, H), 2.9 ppm (m, 1H), 2.8 ppm (m, 2H).

Comparative Example 1

Instead of the EUGG synthesized by Synthesis Example 1, the same mass of the EUGG synthesized by Synthesis Example 3 was used. Others were the same as those of Example 1.

Comparative Example 2

Instead of the 2APG synthesized by Synthesis Example 2, the same mass of the 2APG synthesized by Synthesis Example 4 was used. Others were the same as those of Example 2.

<Total Chlorine Amount Measurement>

According to JIS K-7243-3, the total amounts of chlorine in the epoxy acrylate compounds of Examples 1 and 2 and Comparative Examples 1 and 2, were measured, respectively. Table 1 shows the results.

TABLE 1

| | Total Chlorine Amount/Mass ppm | | Total Chlorine Amount/Mass ppm |
|---|---|---|---|
| Example 1 | 10.4 | Comparative Example 1 | 2534 |
| Example 2 | 8.1 | Comparative Example 2 | 1356 |

From Table 1, it is apparent that Examples 1 and 2 using epoxy acrylate compounds according to Synthesis Examples 1 and 2 show lower chlorine amounts, compared to Comparative Examples 1 and 2 using epoxy acrylate compounds according to Synthesis Examples 3 and 4.

<Reliability Test>

27 parts by mass of commercially offered polyfunctional polyester acrylate (M-7100, manufactured by Toagosei Co., Ltd.), and 3 parts by mass of IRGACURE (registered trademark) 184 as a photoinitiator, were added to 70 parts by mass of each of the epoxy acrylate compounds according to Examples 1 and 2 and Comparative Examples 1 and 2, and mixed to become homogeneous. Each of the obtained curable compositions was printed, by a bar coater, to have a thickness of appropriately 5 µm, on a comb-shaped pattern of a comb-shaped test piece for measurement defined by ISO 9455-17. Using a small UV irradiation device QRU-2161-Z11-00 (Orc Manufacturing Co., Ltd.), the test pieces were exposed to UV at approximately 40 mW/cm$^2$, and cured test pieces were produced.

Ten test pieces were made from each curable composition, and the test pieces were stored in a constant-temperature constant-humidity chamber at 85° C. and 85 RH %. After 1000 hours, with the applied voltage of 100 V, if the inter-electrode insulation resistance of a test piece became 1/1000 or less of the initial resistance value (the order of the 11$^{th}$ power of 10), it was determined that migration occurred in the test piece. The number of such test pieces were counted. Table 2 shows the results. In Table 2, the number of test pieces in which migration occurred, are described.

TABLE 2

| | Reliability Test | | Reliability Test |
|---|---|---|---|
| Example 1 | 0 | Comparative Example 1 | 7 |
| Example 2 | 0 | Comparative Example 2 | 8 |

As shown in Table 2, with respect to the epoxy acrylate compositions using the epoxy acrylate compounds according to Examples 1 and 2, no occurrence of migration was found. On the other hand, with respect to the epoxy acrylate compositions using the epoxy acrylate compounds according to Comparative Examples 1 and 2, migration occurred at a high rate. The reason therefor is believed that the ratio of halogen (chlorine) contained in the epoxy acrylate compound according to each Comparative Example is extremely higher than that of each Example.

The invention claimed is:

1. An epoxy (meth)acrylate compound represented by Formula (1), and having a halogen atom content of 100 ppm by mass or less:

(1)

(wherein, at least one of R$^1$ to R$^5$ has a structure represented by Formula (2); the remainders of R$^1$ to R$^5$ are each independently selected from a group consisting of a hydrogen atom, at alkyl group having 1 to 6 carbon atoms; and an alkoxy group having 1 to 6 carbon atoms; and R$^6$ represents a hydrogen atom or a methyl group),

(2)

(wherein, * represents a bonding position to a carbon atom that constitutes the benzene ring to which $R^1$ to $R^5$ are bonded in Formula (1); and $R^7$ represents a hydrogen atom or a methyl group).

2. An epoxy (meth)acrylate compound according claim 1, wherein the epoxy (meth)acrylate compound is a compound represented by Formula (3) or Formula (4):

(3)

(wherein, $R^8$ represents a hydrogen atom or a methyl group), (4)

(wherein, $R^9$ represents a hydrogen atom or a methyl group).

3. A curable composition comprising: an epoxy (meth)acrylate compound according to claim 1, at least one of monomers and oligomers containing a (meth)acryloyl group, and a photopolymerization initiator.

4. A curable composition comprising: an epoxy (meth)acrylate compound according to claim 2, at least one of monomers and oligomers containing a (meth)acryloyl group, and a photopolymerization initiator.

* * * * *